| (12) | United States Patent | (10) Patent No.: | US 10,613,380 B2 |
|---|---|---|---|
| | Aoki et al. | (45) Date of Patent: | Apr. 7, 2020 |

(54) DISPLAY DEVICE AND COUPLED DISPLAY DEVICE

(71) Applicants: Sharp Kabushiki Kaisha, Sakai, Osaka (JP); Mitsubishi Electric Corporation, Chiyoda-ku, Tokyo (JP)

(72) Inventors: Nobuaki Aoki, Sakai (JP); Atsuhiko Nagamune, Chiyoda-ku (JP); Akitoshi Sudo, Chiyoda-ku (JP)

(73) Assignees: SHARP KABUSHIKI KAISHA, Sakai (JP); MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/365,791

(22) Filed: Mar. 27, 2019

(65) Prior Publication Data

US 2019/0302531 A1 Oct. 3, 2019

(30) Foreign Application Priority Data

Mar. 29, 2018 (JP) .................................. 2018-064703

(51) Int. Cl.
*G02F 1/1335* (2006.01)
*G02F 1/1333* (2006.01)

(52) U.S. Cl.
CPC .. *G02F 1/133603* (2013.01); *G02F 1/133305* (2013.01); *G02F 1/133308* (2013.01); *G02F 1/133524* (2013.01)

(58) Field of Classification Search
CPC ......... G02F 1/133305; G02F 1/133308; G02F 1/133525; G02F 1/133603
See application file for complete search history.

(56) References Cited

U.S. PATENT DOCUMENTS

2009/0009442 A1* 1/2009 Galbraith, Jr. ....... G02B 6/0023
345/83

FOREIGN PATENT DOCUMENTS

JP 2009-294574 A 12/2009

* cited by examiner

*Primary Examiner* — Thomas M Sember
(74) *Attorney, Agent, or Firm* — Keating & Bennett, LLP

(57) ABSTRACT

A display device includes a display panel, a detachable light source, a lighting device, and a display controller. The lighting device includes an attaching and detaching slot in one side surface. The display controller is configured to control driving of the display panel so that an orientation of the image with the display device set in a first position in which the attaching and detaching slot faces toward a first side of a first direction corresponds with an orientation of the image with the display device set in a second position in which the attaching and detaching slot faces toward a second side of the first direction and the display device is inverted from the first position. The first direction is in which attachment and the detachment of the detachable light source is performed. The orientations are with respect to a second direction perpendicular to the first direction.

4 Claims, 7 Drawing Sheets

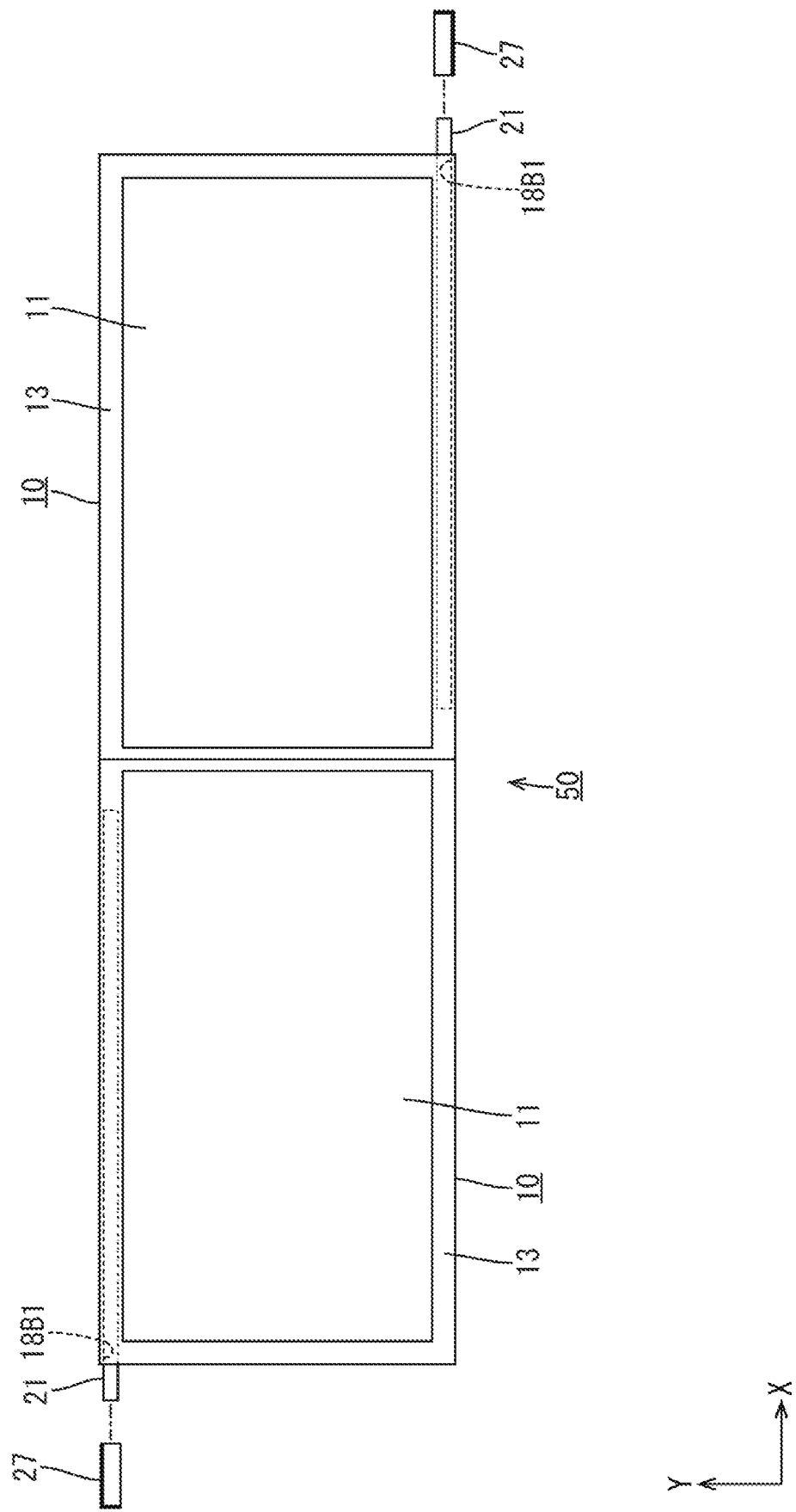

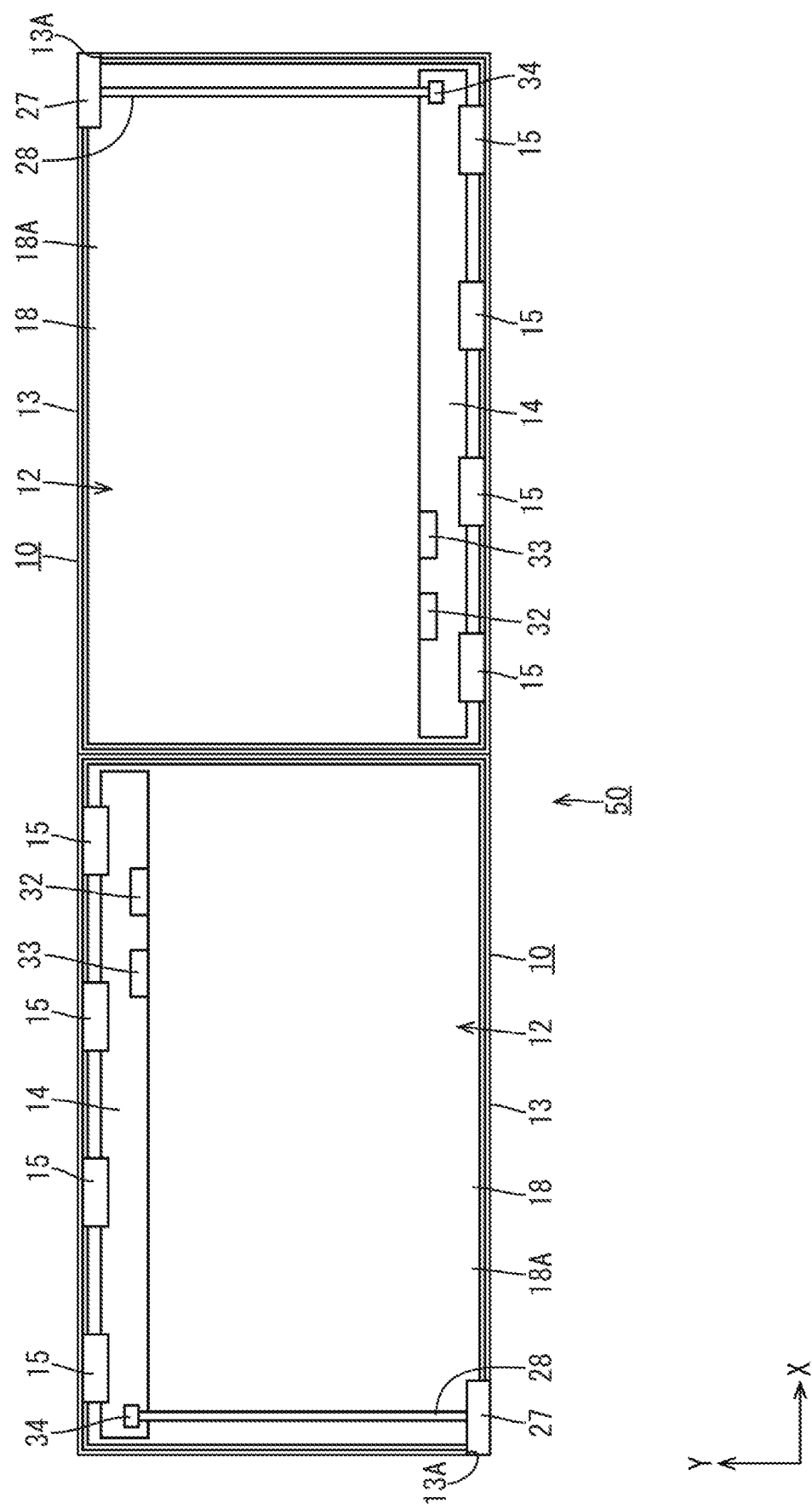

DISPLAY DEVICE AND COUPLED DISPLAY DEVICE

CROSS REFERENCE TO RELATED APPLICATION

This application claims priority from Japanese Patent Application No. 2018-064703 filed on Mar. 29, 2018. The entire contents of the priority application are incorporated herein by reference.

TECHNICAL FIELD

The technology described herein relates to a display device and a coupled display device.

BACKGROUND

An example of a known multiscreen display device is disclosed in Japanese Unexamined Patent Application Publication No. 2009-294574. The multiscreen display device disclosed in Japanese Unexamined Patent Application Publication No. 2009-294574 includes multiple display devices each including a display unit that displays an image and a frame unit that surrounds the outer periphery of the display unit. The respective frame units of the display devices are in close proximity to each other. Each of the frame units has its outer peripheral surface provided with depressions depressed from the outer peripheral surface toward a corresponding one of the display units and projections projecting from the outer peripheral surface toward a side opposite to the corresponding display unit. The depressions and projections of the display devices, which are in close proximity to each other, fit together.

Liquid crystal display devices may be used as individual display devices in a multiscreen display device such as that disclosed in Japanese Unexamined Patent Application Publication No. 2009-294574. A common liquid crystal display device includes a liquid crystal panel and a backlight device that illuminates the liquid crystal panel with light for display. Of these components, the backlight device may have a detachable light source. In that case, the backlight device includes an attaching and detaching slot for permitting attaching and detaching of the light source. However, depending on how the liquid crystal display device is installed, the slot is obstructed by an obstacle (such as a liquid crystal display device coupled to the liquid crystal display device). This has raised fears of making attaching and detaching of the light source difficult.

SUMMARY

The technology described herein was made in view of the above circumstances. An object is to provide a display device in which attachment and detachment of a detachable light source can be performed without being disturbed by an obstacle.

A display device according to the technology described herein includes a display panel configured to display an image, a detachable light source, a lighting device, and a display controller. The lighting device includes an attaching and detaching slot in one side surface for attachment and detachment of the detachable light source. The lighting device is configured to illuminate the display panel with light emitted by the detachable light source. The display controller is configured to control driving of the display panel so that an orientation of the image displayed on the display panel with the display device set in a first position in which the attaching and detaching slot faces toward a first side of a first direction corresponds with an orientation of the image display on the display panel with the display device set in a second position in which the attaching and detaching slot faces toward a second side of the first direction and the display device is inverted from the first position. The first direction is in which the attachment and the detachment of the detachable light source is performed. The orientations are with respect to a second direction perpendicular to the first direction.

According to the configuration, the lighting device illuminates the display panel with light emitted by the detachable light source to display the image on the display panel with the light. Since the detachable light source can be attached to and detached from the lighting device through the attaching and detaching slot, the detachable light source can be replaced. Since the attaching and detaching slot is provided in the side surface of the lighting device, leakage of light through the attaching and detaching slot and entrance of dust through the attaching and detaching slot are less likely to occur in comparison to a lighting device in which attaching and detaching slots are provided in side surfaces of the lighting device.

When the display device is in the first position, the attaching and detaching slot of the lighting device faces toward the first side of the first direction. When the display device is in the second position, that is, inverted from the first position, the attaching and detaching slot of the lighting device faces toward the second side of the first direction. If the attaching and detaching slot is blocked by an obstacle when the display device is set in the first position, the display device may be set in the second position so that the attaching and detaching slot is not blocked by the obstacle. Because the attaching and detaching slot is not blocked by the obstacle, replacement of detachable light source can be easily performed. Furthermore, the display controller controls the driving of the display panel so that the orientation of the image displayed on the display panel with respect to the second direction with the display device set in the first position corresponds with the orientation of the image displayed on the display panel with respect to the second direction with the display device set in the second position. Therefore, the display device in which the detachable light source is easily replaceable properly displays the image.

According to the technology described herein, attaching and detaching of a detachable light source can be properly performed without being disturbed by an obstacle.

BRIEF DESCRIPTION OF THE DRAWINGS

FIG. 6 is a plan view of a coupled liquid crystal display device to or from which detachable LED units are being attached or detached; and FIG. 7 is a back view of the coupled liquid crystal display device.

DETAILED DESCRIPTION

First Embodiment

A first embodiment is described with reference to FIGS. 1 to 7. The first embodiment illustrates a liquid crystal display device (display device) 10 and a coupled liquid crystal display device (coupled display device) 50 including the same. It should be noted that some of the drawings show an X axis, a Y axis, and a Z axis and are drawn so that the direction of each axis is an identical direction in each drawing. Further, FIG. 2 shows the front side up and the back side down.

Figure 1:
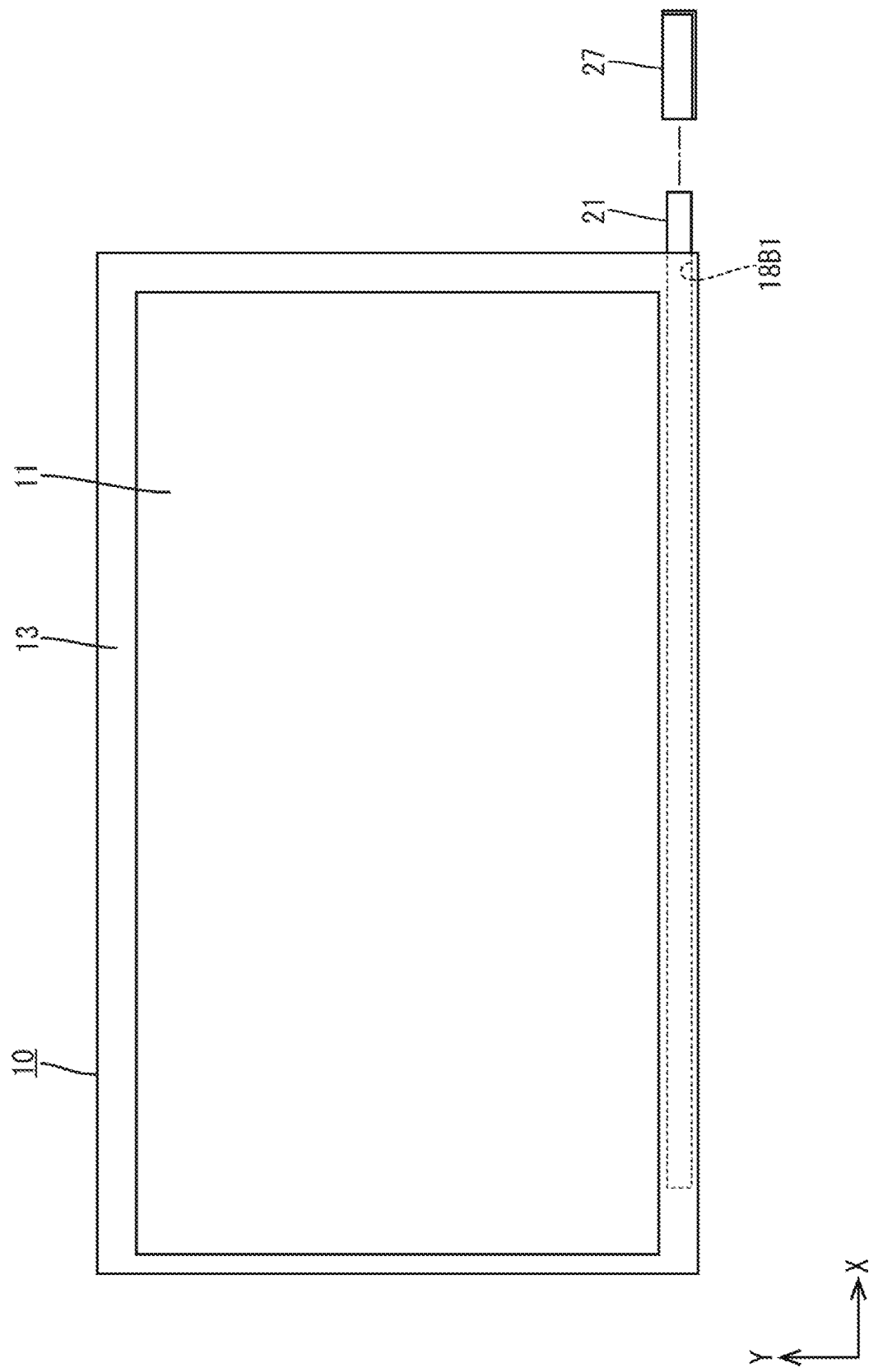
FIG. 1 is a plan view of a liquid crystal display device or from which a detachable LED unit is being attached or detached.

First, the liquid crystal display device 10 is described. As shown in FIG. 1, the liquid crystal display device 10 has a horizontally long substantially square shape as a whole. As shown in FIG. 2, the liquid crystal display device 10 includes a liquid crystal panel (display panel) 11 that displays an image and a backlight device (lighting device) 12 that supplies the liquid crystal panel 11 with light for display, and the liquid crystal panel 11 and the backlight device 12 are integrally held by a frame-shaped bezel 13 or the like. Furthermore, the liquid crystal display device 10 includes a control substrate 14 for controlling the driving of the liquid crystal panel 11 and the backlight device 12.

Figure 2:
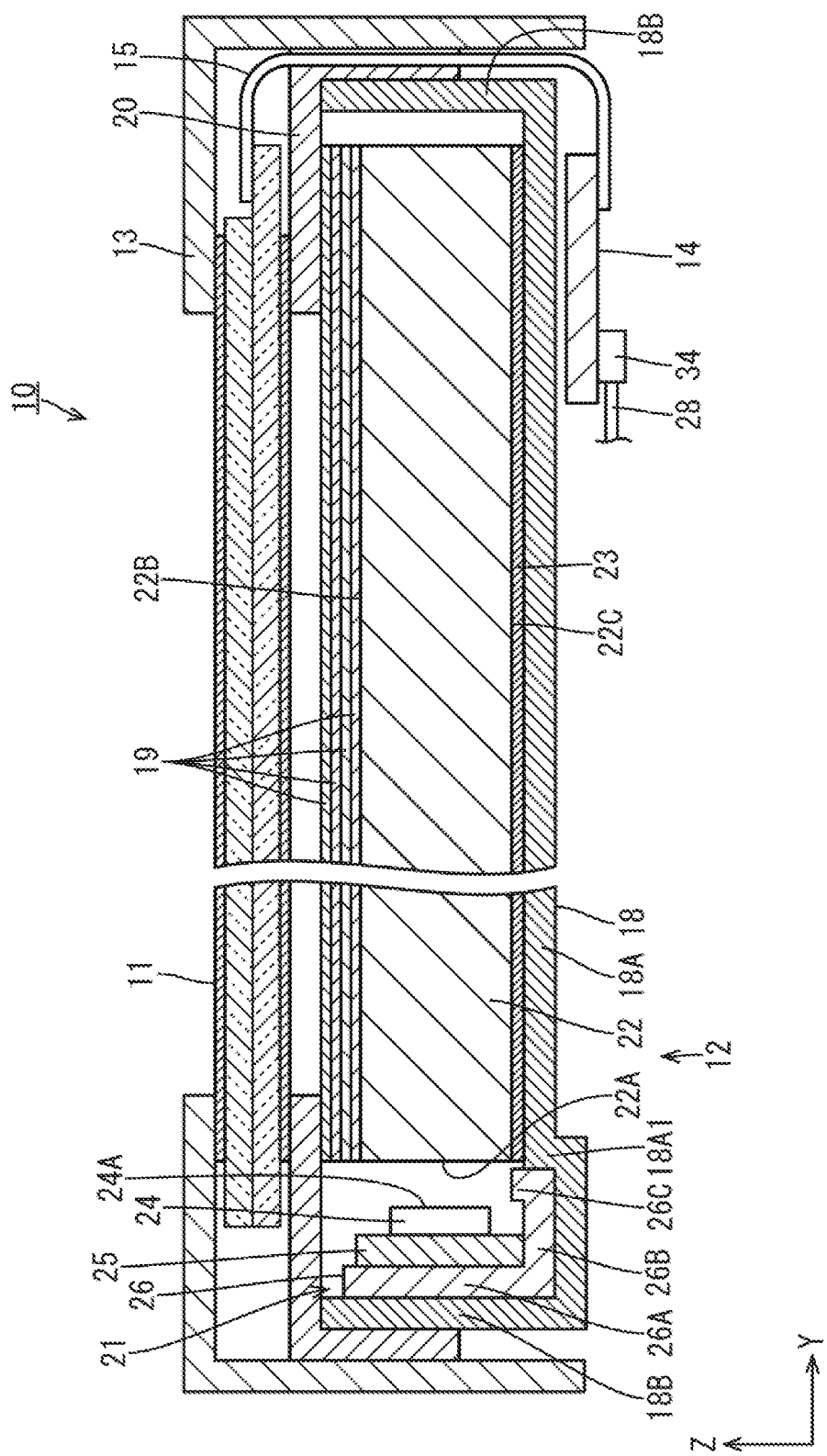
FIG. 2 is a cross-sectional view of the liquid crystal display device as taken along a short side direction.

As shown in FIG. 2, the liquid crystal panel 11 includes a pair of glass substrates bonded together with a predetermined gap therebetween and a liquid crystal layer (not illustrated), sealed in between the two glass substrates, that contains liquid crystal molecules constituting a substance whose optical properties vary in the presence of the application of a voltage. One (namely an array substrate or an active matrix substrate) of the glass substrates has an inner surface over which switching elements (e.g. TFTs) connected to source lines and gate lines that are orthogonal to each other and pixel electrodes connected to the switching elements and placed in square regions surrounded by the source lines and the gate lines are planarly arranged in a matrix and an alignment film and the like are further provided. The other (namely a counter substrate or a CF substrate) of the glass substrates has an inner surface over which a color filter having colored portions such as R (red) portions, G (green) portions, B (blue) portions, and the like planarly arranged in a matrix in a predetermined array is provided and a light-blocking layer (black matrix) placed between the colored portions to form a grid shape, a solid counter electrode opposed to the pixel electrodes, an alignment film, and the like are further provided. It should be noted that a polarizing plate is disposed on an outer surface of each of the two glass substrates. Further, the liquid crystal panel 11 has its long side direction corresponding to an X-axis direction, its short side direction corresponding to a Y-axis direction, and its thickness direction corresponding to a Z-axis direction.

Figure 3:
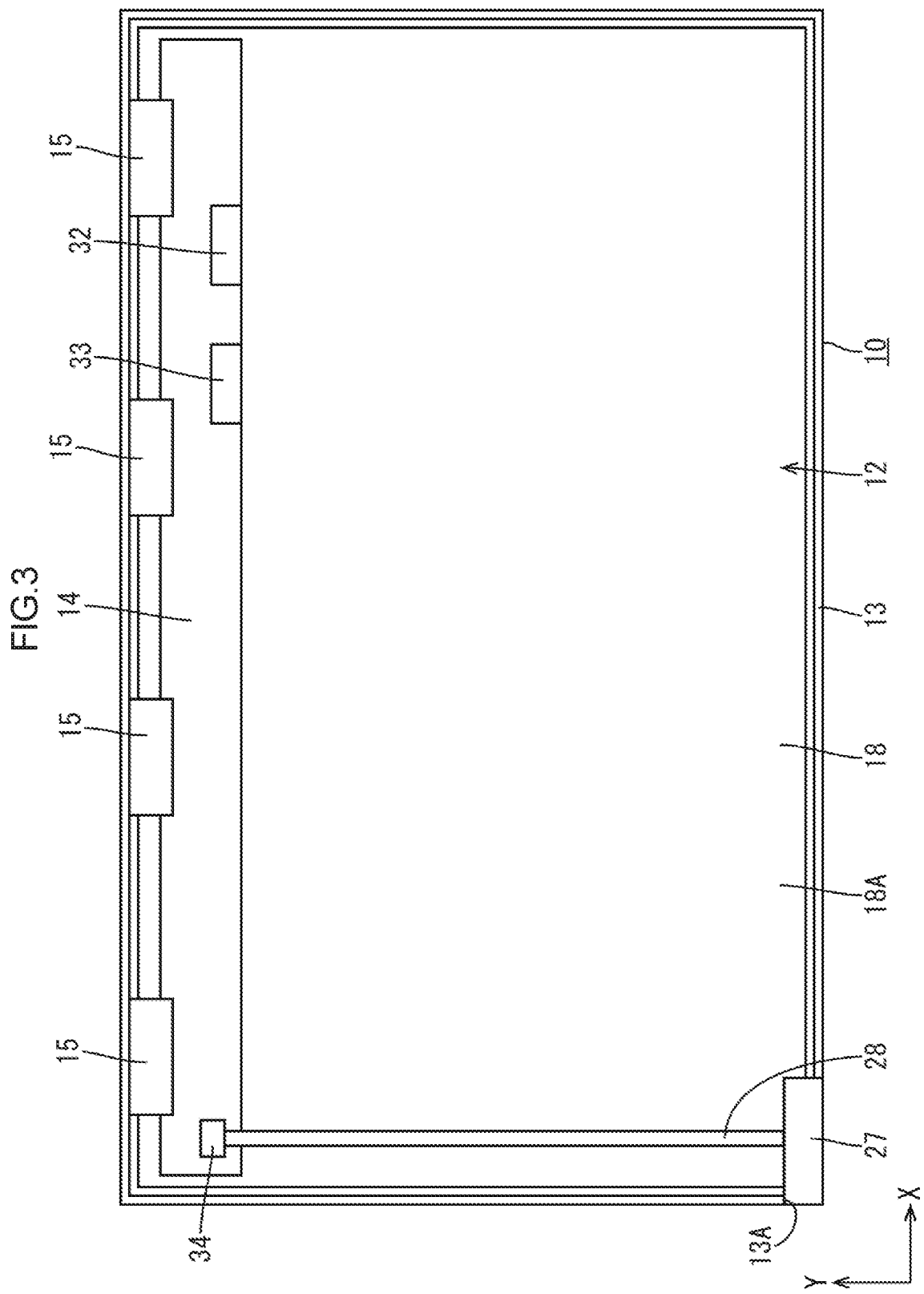
FIG. 3 is a back view of the liquid crystal display device.

As shown in FIGS. 2 and 3, the liquid crystal panel 11 has an end to which a first end of each of multiple panel flexible substrates (flexible substrates) 15 is connected. The panel flexible substrates 15 are each mounted with a driver (not illustrated) by COF (chip on film), and this driver includes an LSI chip having a drive circuit inside. The control substrate 14 is connected to a second end of each of the panel flexible substrates 15. The control substrate 14 is placed behind the backlight device 12. Accordingly, the panel flexible substrates 15, which are connected to the liquid crystal panel 11 and the control substrate 14, are bent (curved) in a folded manner. The panel flexible substrates 15 each include a base material made of an insulative and flexible synthetic resin material (such as polyimide resin) and a large number of wiring patterns (not illustrated) on the base material. The control substrate 14 includes a base material that is higher in rigidity (more rigid) than those of the panel flexible substrates 15 and various types of electronic components mounted on a plate surface of the base material. The panel flexible substrates 15 described above are "panel connecting components" that are connected to both the liquid crystal panel 11 and the control substrate 14.

As shown in FIG. 2, the backlight device 12 includes a substantially box-shaped chassis (housing) 18 having an opening facing toward the front side (i.e. toward the liquid crystal panel 11), an optical member (optical sheet) 19 disposed to cover the opening of the chassis 18, and a frame 20 that supports the optical member 19 from the front side. Furthermore, the chassis 18 houses a detachable LED unit (detachable light source) 21, a light-guiding plate 22 that guides light from the detachable LED unit 21 toward the optical member 19 (liquid crystal panel 11), and a reflecting sheet 23 disposed on a back side of the light-guiding plate 22. Moreover, the backlight device 12 is a one-side light entrance edge-lighting (side-lighting) backlight device in which the detachable LED unit 21 is disposed at one end of the backlight device 12 in a short side direction (Y-axis direction) so that light from the detachable LED unit 21 enters the light-guiding plate 22 through one side. The following describes each constituent component of the backlight device 12 in detail.

Figure 4:
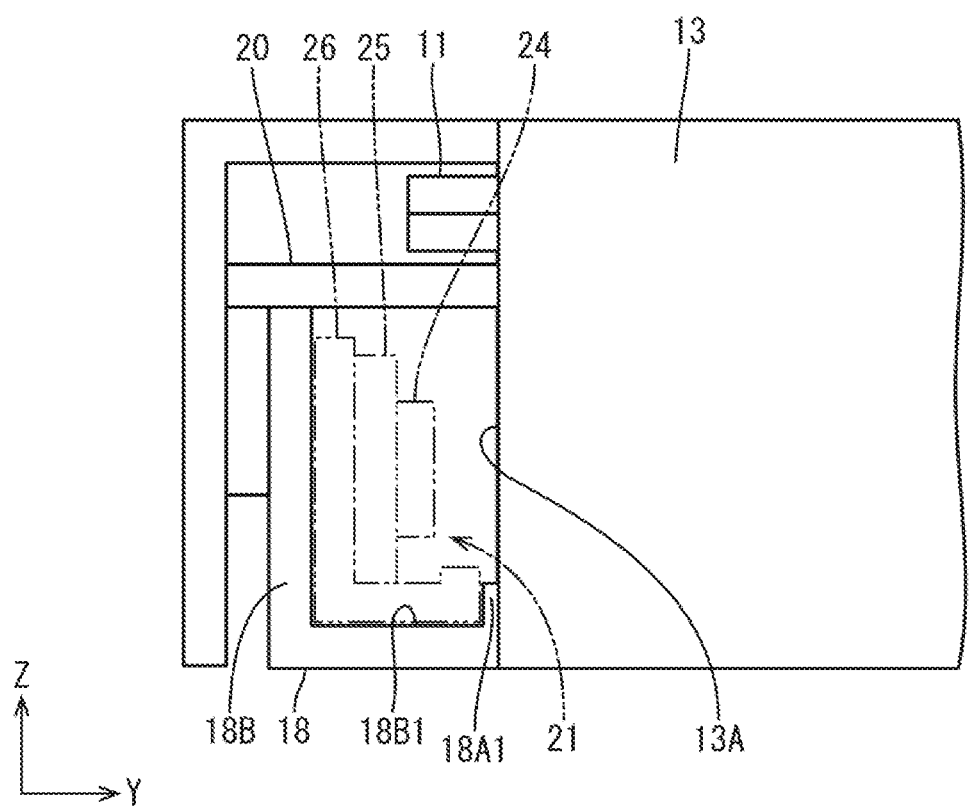
FIG. 4 is a side view of the liquid crystal display device from which the detachable LED unit and an attaching and detaching slot cover have been removed.

The chassis 18 is made of metal and, as shown in FIGS. 2 and 3, includes a bottom part 18A having a horizontally long substantially square shape which is similar to that of the liquid crystal panel 11 and a side part 18B rising from the outer edge of each side of the bottom part 18A. The bottom part 18A has its long side direction corresponding to the X-axis direction (horizontal direction) and its short side direction corresponding to the Y-axis direction (vertical direction). A portion of the bottom part 18 that overlaps the detachable LED unit 21 in a plane view serves as a stepped section 18A1 that becomes lower than the other portion, and the stepped section 18A1 makes it possible to guide an operation of attaching and detaching the detachable LED unit 21. Of the four side parts 18B, one long-side side part 18B enables the detachable LED unit 21 to be held between the side part 18B and the aforementioned stepped section 18A1. Moreover, of the four side parts 18B, one short-side side part 18B has an attaching and detaching slot 18B1 bored therethrough so as to permit attaching and detaching of the detachable LED unit 21, as shown in FIG. 4. It should be noted that the bezel 13 has a communicating slot (notch) 13A, bored through a part thereof that overlaps the attaching and detaching slot 18B1, that communicates with the attaching and detaching slot 18B1. Further, FIG. 4 uses chain double-dashed lines to illustrate the detachable LED unit 21. The attaching and detaching slot 18B1 is selectively provided in only one of the pair of short-side side surfaces of the backlight device 12, and has an opening facing toward one side in the X-axis direction. Since the attaching and detaching slot 18B1 is selectively provided in one side surface of the backlight device 12, situations such as leakage of light through the attaching and detaching slot 18B1 and entrance of extraneous dust through the attaching and detaching slot 18B1 are less likely to arise than if attaching and detaching slots 18B1 are provided in a pair of side surfaces of the backlight device 12. Accordingly, the detachable LED unit 21 is attached and detached along the X-axis direction through the attaching and detaching slot 18B1, and a first direction in which attachment and detachment of the detachable LED unit 21 is performed corresponds to the X-axis direction. This makes it possible to replace the detachable LED unit 21 in a case where the detachable LED unit 21 has failed, a case where a higher-performance (higher-luminance, lower-power-consumption) detachable LED unit 21 has been developed, or a similar case. It should be noted that the Y-axis direction shown in each of the drawings is a second direction perpendicular to the first direction. As shown in FIG. 1, the attaching and detaching slot 18B1 is designed to be closed by an attaching and detaching slot cover 27. The attaching and detaching slot cover 27 is made of synthetic resin, and is mountable on the backlight device 12. Further, in comparison with a case where two attaching and detaching slot covers are needed if attaching and detaching slots 18B1 are provided in a pair of side surfaces of the backlight device 12, the number of attaching and detaching slot covers 27 that are provided can be reduced, so that a reduction in cost can be suitably achieved. Further, the frame 20 and the bezel 13 may be fixed to each side part 18B.

As shown in FIG. 2, by covering the opening of the chassis 18 and being placed between the liquid crystal panel 11 and the light-guiding plate 22, the optical member 19 transmits emitted light from the light-guiding plate 22 and, while imparting a predetermined optical effect to the transmitted light, causing the transmitted light to exit toward the liquid crystal panel 11. The optical member 19 includes multiple (in the first embodiment, four) optical members. Specific examples of types of the optical members include a diffusion sheet, a lens sheet (prism sheet), a reflective polarizing sheet, a lens diffuser, and the like from which a selection can be made as appropriate for use. The frame 20 has a horizontally long frame shape, substantially entirely holds and supports the outer peripheral edges of the optical member 19 and the light-guiding plate 22 from the front side, and substantially entirely receives and supports the outer peripheral edges of the liquid crystal panel 11 from the back side.

As shown in FIG. 1, the detachable LED unit 21 has a long slender rod shape that extends along the X-axis direction. As shown in FIG. 2, the detachable LED unit 21 includes an LED (light-emitting diode) 24 serving as a light source, an LED substrate (light source substrate) 25 on which the LED 24 is mounted, and an LED substrate mounting member (light source substrate mounting member) 26 on which the LED substrate 25 is mounted. Of these components, the LED 24 includes a base member that is firmly fixed to the LED substrate 25, an LED chip on the base member, and a sealant sealing the LED chip. The LED 24 emits white light as a whole by having its LED chip designed to monochromatically emit blue light and having its sealant dispersedly blended with phosphors (such as a yellow phosphor, a green phosphor, and a red phosphor). The LED 24 has its light-emitting surface 24A opposed to a surface thereof mounted on the LED substrate 25, which will be described next. As such, the LED 24 is a so-called top-emitting light-emitting diode.

As shown in FIG. 2, the LED substrate 25 has a plate shape that extends along the X-axis direction (first direction), and is accommodated in the chassis 18 in such a position that a plate surface of the LED substrate 25 runs parallel to the X-axis direction and the Z-axis direction. The LED substrate 25 is mounted in such a manner that a mounting surface of the LED substrate 25 on which more than one of these LEDs 24 are mounted faces an end face (light entrance end face 22A) of the light-guiding plate 22, which will be described next, and a plate surface of the LED substrate 25 opposite to the mounting surface on which the LEDs 24 are mounted makes contact with the LED substrate mounting member 26. The mounting surface of the LED substrate 25 on which the LEDs 24 are mounted is constituted by a metal film (such as copper foil), and has formed thereon a wiring pattern (not illustrated) that is connected to a terminal or the like of each LED 24. The multiple LEDs 24 are placed at intervals along the X-axis direction on the mounting surface of the LED substrate 25. The LED substrate 25 is provided with a feeding connector (not illustrated) to which a backlight flexible flat cable (light source feed component) 28 has its first end connected. The backlight flexible flat cable 28 has its second end drawn out of the chassis 18 and connected to the control substrate 14 (see FIG. 3). The backlight flexible flat cable 28 includes multiple wiring parts running parallel to each other and insulative and flexible films, made of synthetic resin, between which the wiring parts are sandwiched. The LED substrate mounting member 26 has a rail shape that extends along the X-axis direction as with the LED substrate 25, and has its cross-section shape in conformance with a cross-sectional shape of the chassis 18. Specifically, the LED substrate mounting member 26 includes a plate surface contact part 26A with which the plate surface of the LED substrate 25 is brought into contact, an end face contact part 26B with which an end face of the LED substrate 25 is brought into contact, and a raised part 26C raised from an end of the end face contact part 26B opposite to the plate surface contact part 26A and placed at a distance from the LED substrate 25. Among these, the plate surface contact part 26A has its outer surface brought into contact with a side part 18B of the chassis 18 and the end face contact part 26B and the raised part 26C have their outer surfaces brought into contact with the base part 18A of the chassis 18, whereby it is made possible to guide the operation (slide operation) of attaching and detaching the detachable LED unit 21 to and from the chassis 18.

The light-guiding plate 22 is made of a substantially transparent synthetic resin material (e.g. acrylic resin such as PMMA, polycarbonate, or the like), and has a sufficiently higher refractive index than air. As shown in FIG. 2, the light-guiding plate 22 has a horizontally long plate shape which is similar to that of the liquid crystal panel 11 or the like, is accommodated in the chassis 18 in such a manner as to be surrounded by the chassis 18 on every side, and is located directly below the liquid crystal panel 11 and the optical member 19. The light-guiding plate 22 has outer peripheral end faces including one long-side end face (left in FIG. 2) that serves as a light entrance end face (light source opposed end face) 22A, opposed to the LEDs 24, upon which light from the LEDs 24 falls. The light-guiding plate 22 has a pair of front and back plate surfaces. That one of these plate surfaces which faces toward the front side (i.e. toward the liquid crystal panel 11) serves as a light exit plate surface 22B that causes light to exit toward the liquid crystal panel 11, and that one of these plate surfaces which faces toward the back side serves as a light exit opposite plate surface 22C opposed to the light exit plate surface 22B. With such a configuration, the light-guiding plate 22 has a function of introducing, through the light entrance end face 22A, light emitted along the Y-axis direction from the LEDs 24 and, after having propagated the light inside, raising the light along the Z-axis direction and causing the light to exit through the light exit surface 22B toward the optical member 19 (i.e. toward the front side or light exit side).

As shown in FIG. 2, the reflecting sheet 23 is disposed to cover the light exit opposite plate surface 22C of the light-guiding plate 22. The reflecting sheet 23 is high in light reflectivity and can efficiently raise, toward the front side (i.e. toward the light exist plate surface 22B), light leaked through the light exit opposite plate surface 22C of the light-guiding plate 22.

Figure 5:
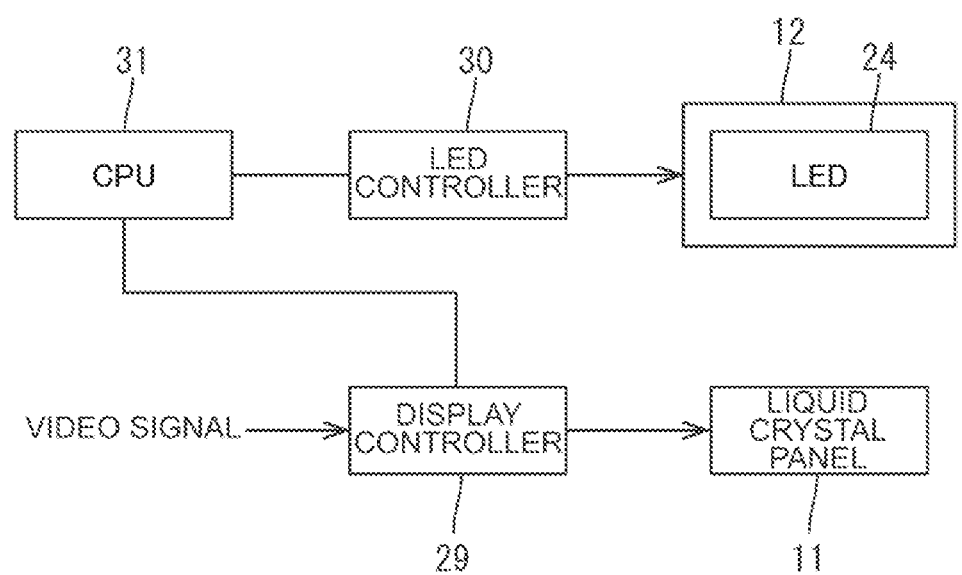
FIG. 5 is a block diagram showing an electrical configuration of the liquid crystal display device.

As shown in FIG. 5, the liquid crystal display device 10 according to the first embodiment includes at least a display controller (display panel controller) 29 for controlling the driving of the liquid crystal panel 11 and an LED controller (light source controller) 30 for controlling the driving of the LEDs 24 of the backlight device 12. The display controller 29 includes a video signal processing circuit that process a video signal and a pixel driver that drives each pixel in accordance with an output signal from the video signal processing circuit, and is provided on the control substrate 14. The LED controller 30 includes an LED driver that drives the LEDs 24, and is provided on the control substrate 14. The control substrate 14 is provided with a CPU 31 that controls how the display controller 29 and the LED controller 30 operate.

As shown in FIGS. 2 and 3, the control substrate 14 is provided with a panel input connector 32 to which a connector of a flexible substrate having its first end connected to an external panel signal supply source and its second end provided with the connector is connected (neither the flexible substrate nor the external panel signal supply source illustrated) and to which a video signal is supplied, a backlight input connector 33 to which a connector of a flexible substrate having its first end connected to an external backlight signal supply source and its second end provided with the connector is connected (neither the flexible substrate nor the external backlight signal supply source illustrated) and to which a backlight signal is supplied, and a backlight output connector 34 to which the second end of the backlight flexible flat cable 28, which has its first end connected to the feeding connector of the LED substrate 25, is connected. The external panel signal supply source supplies an original video signal to the panel input connector 32 of the control substrate 14. The control substrate 14 processes the original video signal thus supplied. The liquid crystal display panel 11 displays an image in accordance with the video signal thus processed. The external backlight signal supply source supplies an original backlight signal to the backlight input connector 33 of the control substrate 14. The control substrate 14 processes the original backlight signal thus supplied. The LEDs 24 are driven in accordance with an LED drive signal processed.

It should be noted that the external panel signal supply source and the external backlight signal supply source may be connected to the panel input connector 32 and the backlight input connector 33 by electric wires such as discrete wires or flat cables, respectively.

Next, the coupled liquid crystal display device 50 is described. As shown in FIGS. 6 and 7, the coupled liquid crystal display device 50 includes two liquid crystal display devices 10 coupled to each other after having been arranged adjacent to each other in the X-axis direction. This allows a horizontally long image to be suitably displayed by the two liquid crystal display devices 10. Specific suitable examples of uses of the coupled liquid crystal display device 50 include digital signage that is installed around the doors of a train, and suitable examples of images to be displayed include train maps and advertisements. It should be noted that the first embodiment omits to illustrate a specific coupling structure through which the liquid crystal display devices 10 adjacent to each other are coupled to each other.

Moreover, as shown in FIG. 6, a liquid crystal display device 10 according to the first embodiment is installed in either a first position in which the attaching and detaching slot 18B1 of the backlight device 12 faces toward a first side in the X-axis direction (first direction of the detachable LED unit 21) or a second position in which the attaching and detaching slot 18B1 faces toward a second side, which is a reversal of the first position in the X-axis direction. The first embodiment assumes that the liquid crystal display device 10 shown on the right in FIG. 6 (and shown on the left in FIG. 7) is in the first position and the liquid crystal display device 10 shown on the left in FIG. 6 (and shown on the right in FIG. 7) is in the second position. Accordingly, for example, in a case where the attaching and detaching slot 18B1 of a liquid crystal display device 10 placed in the first position is obstructed by an obstacle (i.e. the liquid crystal display device 10 shown on the right in FIG. 6), the obstruction of the attaching and detaching slot 18B1 by the obstacle can be avoided by placing the liquid crystal display device 10 in the second position, which is a reversal of the first position. In a case where the attaching and detaching slot 18B1 of a liquid crystal display device 10 placed in the second position is obstructed by an obstacle (i.e. the liquid crystal display device 10 shown on the left in FIG. 6), the liquid crystal display device 10 needs only be placed in the first position, which is a reversal of the second position. Specifically, since the two liquid crystal display devices 10 of the coupled liquid crystal display device 50 are placed in mutually reversed positions so that the attaching and detaching slots 18B1 have their openings facing outward in the X-axis direction, each of the attaching and detaching slots 18B1 is prevented from being obstructed by its neighboring liquid crystal display device 10. This permits each of the detachable LED units 21 to be attached and detached through a corresponding one of the attaching and detaching slots 18B1. This prevents attaching and detaching of the detachable LED unit 21 from being obstructed by an obstacle (i.e. a neighboring liquid crystal display device 10) and therefore makes it possible to easily replace the detachable LED unit 21. Meanwhile, the display controller 29 controls the driving of the liquid crystal panel 11 so that in both the first and second positions, images displayed on the liquid crystal panel 11 are identical in orientation to each other in the Y-axis direction (the second direction perpendicular to the first direction). This makes it possible to display an appropriate image on the liquid crystal display panel 11 while securing easy replacing of the detachable LED unit 21. Moreover, the liquid crystal display devices 10 adjacent to each other in the X-axis direction are identical to each other. This makes it possible to make the cost of manufacturing the liquid crystal display devices 10 lower than if liquid crystal display devices adjacent to each other in the X-axis direction are different from each other.

Specifically, the display controller 29 enables a first display signal for display in the first position shown in FIG. 7 and a second display signal for display in the second position shown in FIG. 7 to be selectively outputted in accordance with a video signal that is supplied from the external panel signal supply source. More specifically, a video signal that is outputted from the external panel signal supply source includes either a first display trigger signal or a second display trigger signal. In a case where the first display trigger signal is included, the display controller 29 outputs the first display signal, and in a case where the second display trigger signal is included, the display controller 29 outputs the second display signal. The first display trigger signal and the second display trigger signal are supplied to an identical terminal of the panel input connector 32. One of the first and second trigger signals is a high-voltage signal, and the other of the first and second trigger signals is a low-voltage signal. Whether the external panel signal supply source outputs the first display trigger signal or the second display trigger signal may be controlled by adjusting the settings of the external panel signal supply source according to the position of the liquid crystal display device 10 installed. Accordingly, regarding the liquid crystal display device 10 placed in the first position as shown on the left in FIG. 7, the inclusion of the first display trigger signal in the video signal that is outputted from the external panel signal supply source causes the first display signal to be outputted from the display controller 29 and supplied to the liquid crystal panel 11 via the panel flexible substrates 15. As a result, the first display signal causes an image appropriately oriented in the Y-axis direction to be displayed on the liquid crystal panel 11 of the liquid crystal display device 10 placed in the first position. On the other hand, regarding the liquid crystal display device 10 placed in the second position as shown on the right in FIG. 7, the inclusion of the second display trigger signal in the video signal that is outputted from the external panel signal supply source causes the second display signal to be outputted from the display controller 29 and supplied to the liquid crystal panel 11 via the panel flexible substrates 15. As a result, the second display signal causes an image appropriately oriented in the Y-axis direction to be displayed on the liquid crystal panel 11 of the liquid crystal display device 10 placed in the second position. By thus adjusting, according to the position of the liquid crystal display device 10, whether the video signal that is outputted from the external panel signal supply source includes the first display trigger signal or the second display trigger signal, the orientation in the Y-axis direction of an image that is displayed on the liquid crystal panel 11 can be normalized.

The following describes a positional relationship between the attaching and detaching slot 18B1 of the backlight device 12 and the panel flexible substrates 15. As shown in FIGS. 2 and 3, the panel flexible substrates 15 are disposed to overlap a long-side side surface of the four side surfaces of the backlight device 12 that is located opposite to the detachable LED unit 21. That is, the panel flexible substrates 15 are disposed to overlap a side surface of the four side surfaces of the backlight device 12 in which the attaching and detaching slot 18B1 is not formed. This makes it possible to avoid a situation where the detachable LED unit 21 interferes with the panel flexible substrates 15 during attaching or detaching of the detachable LED unit 21 to or from the backlight device 12 through the attaching and detaching slot 18B1. This makes it possible to prevent the panel flexible substrates 15 from getting damaged by attaching or detaching of the detachable LED unit 21.

As described above, a liquid crystal display device (display device) 10 according to the first embodiment includes: a liquid crystal panel (display panel) 11 that displays an image; a detachable LED unit (detachable light source) 21; a backlight device (lighting device) 12 that has an attaching and detaching slot 18B1 selectively provided in one side surface so as to permit attaching and detaching of the detachable LED unit 21 and that illuminates the liquid crystal panel 11 with light emitted by the detachable LED unit 21; and a display controller 29 that controls driving of the liquid crystal panel 11 so that in both a first position in which the attaching and detaching slot 18B1 faces toward a first side in a first direction in which the detachable LED unit 21 is performed and a second position in which the attaching and detaching slot 18B1 faces toward a second side in the first direction, images displayed on the liquid crystal panel 11 are identical in orientation to each other in a second direction perpendicular to the first direction, the second position being a reversal of the first position.

This allows the backlight device 12 to illuminate the liquid crystal panel 11 with light emitted by the detachable LED unit 21, and the illuminating light is utilized to cause an image to be displayed on the liquid crystal panel 11. Since the detachable LED unit 21 can be attached to and detached from the backlight device 12 through the attaching and detaching slot 18B1, the detachable LED unit 21 can be replaced. Since the attaching and detaching slot 18B1 is selectively provided in one side surface of the backlight device 12, situations such as leakage of light through the attaching and detaching slot 18B1 and entrance of extraneous dust through the attaching and detaching slot 18B1 are less likely to arise than if attaching and detaching slots 18B1 are provided in a pair of side surfaces of the backlight device 12.

When the liquid crystal display device 10 is in the first position, the attaching and detaching slot 18B1 of the backlight device 12 faces toward the first side in the first direction, and when the liquid crystal display device 10 is in the second position, which is a reversal of the first position, the attaching and detaching slot 18B1 of the backlight device 12 faces toward the second side in the first direction. Accordingly, for example, in a case where the attaching and detaching slot 18B1 is obstructed by an obstacle when the liquid crystal display device 10 is placed in the first position, the obstruction of the attaching and detaching slot 18B1 by the obstacle can be avoided by placing the liquid crystal display device 10 in the second position. This prevents attaching and detaching of the detachable LED unit 21 from being obstructed by the obstacle and therefore makes it possible to easily replace the detachable LED unit 21. Moreover, the display controller 29 controls the driving of the liquid crystal panel 11 so that in both the first and second positions, images displayed on the liquid crystal panel 11 are identical in orientation to each other in the second direction, thus making it possible to display an appropriate image while securing easy replacing of the detachable LED unit 21.

Further, the liquid crystal display device 10 further includes a panel flexible substrate (flexible substrate) 15 connected to an end of the liquid crystal panel 11 and disposed to overlap a side surface of the backlight device 12 in which the attaching and detaching slot 18B1 is not formed. This causes the detachable LED unit 21 to be disposed not to overlap the panel flexible substrate 15, thus making it possible to avoid a situation where the detachable LED unit 21 interferes with the panel flexible substrates 15 during attaching or detaching of the detachable LED unit 21 to or from the backlight device 12. This makes it possible to prevent the panel flexible substrate 15 from getting damaged by attaching or detaching of the detachable LED unit 21.

Further, the liquid crystal display device 10 further includes an attaching and detaching slot cover 27 that closes the attaching and detaching slot 18B1. This makes it only necessary to include one attaching and detaching slot cover 27, thus making cost lower than if attaching and detaching slots 18B1 are provided in a pair of side surfaces of the backlight device 12.

Further, a coupled liquid crystal display device 50 according to the first embodiment includes liquid crystal display devices 10 described above, and the liquid crystal display devices 10 are coupled to each other in such a manner as to be adjacent to each other in the first direction. In the coupled liquid crystal display device 50, the liquid crystal display devices 10 adjacent to each other in the first direction include a first liquid crystal display device 10 placed in the first position and a second liquid crystal display device 10 placed in the second position and are disposed so that the attaching and detaching slots 18B1 of the liquid crystal display devices 10 face outward. Coupling the liquid crystal display devices 10 in such a manner that they are adjacent to each other in the first direction may cause the attaching and detaching slot 18B1 of each of the liquid crystal display devices 10 to be obstructed by a neighboring liquid crystal display device 10. In this regard, when the liquid crystal display devices 10 adjacent to each other in the first direction include a first liquid crystal display device 10 placed in the first position and a second liquid crystal display device 10 placed in the second position and are disposed so that the attaching and detaching slots 18B1 of the liquid crystal display devices 10 face outward, the detachable LED units 21 are permitted to be attached and detached through the respective attaching and detaching slots 18B1.

Further, the liquid crystal display devices 10 adjacent to each other in the first direction are identical to each other. This makes it possible to make the cost of manufacturing the liquid crystal display devices 10 lower than if liquid crystal display devices adjacent to each other in the first direction are different from each other.

Other Embodiments

The technology described herein is not limited to the embodiments described above with reference to the drawings. The following embodiments may be included in the technical scope.

(1) The control substrate may be provided with a single input connector to which a video signal and a backlight signal are supplied.

(2) The LED controller may be provided on an LED control substrate provided separately from the control substrate.

(3) Each of the liquid crystal display devices may be used alone. For example, in the case of an installation environment where an obstacle is placed in such a manner as to be adjacent to the liquid crystal display device in the X-axis direction, the obstruction of attaching and detaching of the detachable LED unit can be avoided by positioning the liquid crystal display device so that the attaching and detaching slot faces away from the obstacle.

(4) Not all constituent components of each of the two liquid crystal display devices need to be identical to those of the other liquid crystal display device. For example, since commonality of major components (such as liquid crystal panels, optical members, light-guiding plates, reflecting sheets, and detachable LED units) brings about a sufficient cost reduction effect, peripheral components of each of the two liquid crystal display devices other the major components may be different from (non-identical to) those of the other liquid crystal display device. Besides those constituent components named above, which constituent components of the two liquid crystal display devices are commonalized is subject to change as appropriate.

(5) Multiple LED substrates may be mounted on the LED substrate mounting member.

(6) The detachable LED unit may include multiple LED substrate mounting members.

(7) It is possible to use a two-side light entrance backlight device. In that case, two attaching and detaching slots are bored through one and the same side surface of the backlight device.

(8) The number of panel flexible substrates that are provided, the placement of the panel flexible substrates, and the like are subject to change as appropriate. Further, the backlight flexible flat cable described in the embodiment described above may be replaced by a backlight flexible substrate.

(9) The specific number, type, order of stacking, and the like of optical sheets that are used in the backlight device are subject to change as appropriate.

(10) It is possible to use a side-emitting LED as the light source. Alternatively, it is possible to use a non-LED light source (such as organic EL).

(11) Specific uses of the coupled liquid crystal display device are subject to change as appropriate.

(12) The technology described herein is also applicable to other types of display panel (such as a MEMS (microelectromechanical systems) display panel).

(13) Specific uses of the liquid crystal display device are subject to change as appropriate.

The invention claimed is:

1. A coupled display device comprising:
a plurality of display devices, each of the plurality of display devices including:
    a display panel that displays an image;
    a detachable light source;
    a lighting device including an attaching and detaching slot in one side surface for attachment and detachment of the detachable light source, the lighting device illuminates the display panel with light emitted by the detachable light source; and
    a display controller that controls driving of the display panel so that an orientation of the image displayed on the display panel with the display device set in a first position in which the attaching and detaching slot faces toward a first side of a first direction corresponds with an orientation of the image displayed on the display panel with the display device set in a second position in which the attaching and detaching slot faces toward a second side of the first direction and the display device is inverted from the first position, the first direction being in which the attachment and the detachment of the detachable light source is performed, the orientations being with respect to a second direction perpendicular to the first direction, wherein
the plurality of display devices are coupled to each other to be adjacent to each other in the first direction,
the plurality of display devices adjacent to each other in the first direction include a first display device in the first position and a second display device in the second position, and
the attaching and detaching slots of the plurality of display devices face outward.

2. The coupled display device according to claim 1, further including a flexible substrate connected to an end of the display panel and disposed to overlap a side surface of the lighting device in which the attaching and detaching slots are not defined.

3. The coupled display device according to claim 1, further comprising an attaching and detaching slot cover that closes the attaching and detaching slots.

4. The coupled display device according to claim 1, wherein the plurality of display devices adjacent to each other in the first direction are identical to each other.

* * * * *